United States Patent
Jaber et al.

(10) Patent No.: US 11,221,311 B2
(45) Date of Patent: Jan. 11, 2022

(54) VAPOR AND/OR GAS CONCENTRATION AND TEMPERATURE SENSOR

(71) Applicant: KING ABDULLAH UNIVERSITY OF SCIENCE AND TECHNOLOGY, Thuwal (SA)

(72) Inventors: Nizar Jaber, Thuwal (SA); Mohammad Ibrahim Younis, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 16/982,854

(22) PCT Filed: May 6, 2019

(86) PCT No.: PCT/IB2019/053700
§ 371 (c)(1),
(2) Date: Sep. 21, 2020

(87) PCT Pub. No.: WO2019/215587
PCT Pub. Date: Nov. 14, 2019

(65) Prior Publication Data
US 2021/0055264 A1  Feb. 25, 2021

Related U.S. Application Data

(60) Provisional application No. 62/667,911, filed on May 7, 2018.

(51) Int. Cl.
*G01N 29/036* (2006.01)
*G01N 29/02* (2006.01)
*G01N 29/32* (2006.01)

(52) U.S. Cl.
CPC ......... *G01N 29/036* (2013.01); *G01N 29/022* (2013.01); *G01N 29/326* (2013.01);
(Continued)

(58) Field of Classification Search
CPC .. G01N 29/022; G01N 29/326; G01N 29/036; G01N 2291/021;
(Continued)

(56) References Cited

U.S. PATENT DOCUMENTS

| | | | |
|---|---|---|---|
| 2015/0177196 A1* | 6/2015 | Sussner | G01N 29/2406 73/24.04 |
| 2017/0269052 A1* | 9/2017 | Adams | G01N 33/0057 |
| 2018/0052124 A1* | 2/2018 | Rogers | G01N 29/326 |

OTHER PUBLICATIONS

International Search Report in corresponding/related International Application No. PCT/IB2019/053700, dated Dec. 17, 2019.
(Continued)

*Primary Examiner* — Benjamin R Schmitt
(74) *Attorney, Agent, or Firm* — Patent Portfolio Builders PLLC

(57) ABSTRACT

A vapor and/or gas concentration and temperature sensor includes a resonating structure having a first side with a functionalized surface and a second side opposite the first side, a first resonant frequency of a first vibration mode, and a second resonant frequency of a second vibration mode. Drive and sensing electrodes face the second side of the resonating structure. A direct current bias source is coupled to the resonating structure. A first AC voltage source provides the resonating structure with a first voltage having a frequency corresponding to the first resonant frequency. A second AC voltage source provides the resonating structure with a second voltage having a frequency corresponding to the second resonant frequency. A read-out circuit determines a vapor and/or gas concentration based on a difference between the frequency of the first voltage and a first read-out
(Continued)

frequency and determines a temperature based on a difference between the frequency of the second voltage and a second read-out frequency.

20 Claims, 5 Drawing Sheets

(52) U.S. Cl.
CPC ............... *G01N 2291/021* (2013.01); *G01N 2291/02809* (2013.01); *G01N 2291/02881* (2013.01); *G01N 2291/0427* (2013.01)

(58) Field of Classification Search
CPC .......... G01N 2291/02809; G01N 2291/02881; G01N 2291/0427
See application file for complete search history.

(56) References Cited

OTHER PUBLICATIONS

Jaber, N., et al., "Resonant Gas Sensor and Switch Operating in Air With Metal-Organic Frameworks Coating," Journal of Microelectromechanical Systems, Apr. 2018, vol. 27, pp. 156-163, IEEE.

Jaber, N., et al., "Sensitive Resonant Gas Sensor Operating in Air with Metal Organic Frameworks Coating," 2017 19th International Conference on Solid-State Sensors, Actuators and Microsystems (Transducers), IEEE, Jun. 18, 2017, pp. 1081-1087.

Kazmi, S.N.R., et al., "Mechanical Computing Using Multifrequency Excited NEMS Resonator," Proceedings of the 13th Annual IEEE International Conference on Nano-Micro Engineered and Molecular Systems (NEMS), IEEE, Apr. 22, 2018, pp. 229-233.

Ramini, A., et al., "Mixed Frequency Excitation of an Electrostatically Actuated Resonator," Microsystem Technologies, Apr. 24, 2015, vol. 22, No. 8, pp. 1967-1974, Springer.

Written Opinion of the International Searching Authority in corresponding/related International Application No. PCT/IB2019/053700, dated Dec. 17, 2019.

Bouchaala, A., et al., "A Smart Microelectromechanical Sensor and Switch Triggered by Gas," Applied Physics Letters, Jul. 5, 2016, vol. 109, pp. 013502-1-013502-4, AIP Publishing.

International Search Report in corresponding/related International Application No. PCT/IB2019/053701, dated Aug. 8, 2019 (Documents D2 and D3 were provided in the IDS filed Sep. 21, 2020).

Written Opinion of the International Searching Authority in corresponding/related International Application No. PCT/IB2019/053701, dated Aug. 8, 2019 (Documents D2 and D3 were provided in the IDS filed Sep. 21, 2020).

* cited by examiner

VAPOR AND/OR GAS CONCENTRATION AND TEMPERATURE SENSOR

CROSS-REFERENCE TO RELATED APPLICATIONS

This application is a U.S. National Stage Application of International Application No. PCT/IB2019/053700, filed on May 6, 2019, which claims priority to U.S. Provisional Patent Application No. 62/667,911, filed on May 7, 2018, entitled "MULTIMODE MEMS RESONANT SENSOR FOR SMART FUNCTIONALITIES," the disclosures of which are incorporated herein by reference in their entirety.

BACKGROUND

Technical Field

Embodiments of the subject matter disclosed herein generally relate to a sensor that includes a single resonating structure used to determine vapor and/or gas concentration and temperature.

Discussion of the Background

Electrostatically actuated micromechanical systems- (MEMS-) based resonators have been used for biological, chemical, and gas concentration sensors. These MEMS-based resonators provide low power consumption, ease of fabrication, and compatibility with CMOS circuits. The principle of operation of using these resonators as sensors is tracking the frequency shift in the fundamental mode due to external stimuli, such as gas adsorption, pressure change, and protein detection.

Most gas concentration sensors, including MEMS-based resonators, suffer from cross-sensitivity to environmental temperature, which significantly reduces the accuracy and reliability of the gas concentration measurements. Currently, obtaining accurate and reliable gas concentration measurements involves arranging a thermometer in close proximity to the gas sensor and using the temperature to compensate for sensor drift. Employing an additional thermometer increases device size, fabrication cost, and power required to operate the sensor. This also increases the complexity of the signal processing for reading the gas concentration signal and compensating the reading based on a signal from the thermometer.

Thus, there a sensor that can sense both gas concentration and temperature using a common structure so that the gas concentration measurement can be compensated for based on the measured temperature.

SUMMARY

According to an embodiment, there is a vapor and/or gas concentration and temperature sensor, which includes a resonating structure having a first side with a functionalized surface and a second side that is opposite the first side. The resonating structure has a first resonant frequency of a first vibration mode and a second resonating frequency of a second vibration mode, and wherein the resonating structure is a resonating microstructure or nanostructure. The sensor also includes a drive electrode and a sensing electrode arranged facing the second side of the resonating structure. A direct current bias source is coupled to the resonating structure. A first alternating current (AC) voltage source is coupled to the drive electrode. The first AC voltage source provides the resonating structure, via the drive electrode, with a first voltage having a frequency corresponding to the first resonant frequency. A second AC voltage source is coupled to the drive electrode. The second AC voltage source provides the resonating structure, via the drive electrode, with a second voltage having a frequency corresponding to the second resonant frequency. A read-out circuit is coupled to the sensing electrode. The read-out circuit is configured to determine a vapor and/or gas concentration based on a difference between the frequency of the first voltage supplied by the first AC voltage source and a first read-out frequency obtained by the read-out circuit from the resonating structure via the sensing electrode and is configured to determine a temperature based on a difference between the frequency of the second voltage supplied by the second AC voltage source and a second read-out frequency obtained by the read-out circuit from the resonating structure via the sensing electrode.

According to another embodiment, there is a method for determining vapor and/or gas concentration and temperature using a vapor and/or gas concentration and temperature sensor. A direct current bias voltage is applied to a resonating structure. The resonating structure has a first side with a functionalized surface and a second side that is opposite the first side. The resonating structure has a first resonant frequency of a first vibration mode and a second resonating frequency of a second vibration mode. The resonating structure is a resonating microstructure or nanostructure. A first alternating current (AC) voltage is applied to the resonating structure via a drive electrode, which is arranged facing the second side of the resonating structure. The first AC voltage provides the resonating structure, via the drive electrode, with a first voltage having a frequency corresponding to the first resonant frequency. A second AC voltage is applied to the resonating structure via the drive electrode. The second AC voltage provides the resonating structure, via the drive electrode, with a second voltage having a frequency corresponding to the second resonant frequency. A vapor and/or gas concentration is determined based on a difference between the frequency of the first AC voltage and a first read-out frequency. A temperature is determined based on a difference between the frequency supplied by the second AC voltage and a second read-out frequency.

According to a further embodiment, there is a method for forming a vapor and/or gas concentration and temperature sensor. A resonating structure, a drive electrode, and a sensing electrode are provided. The resonating structure has a first side with a functionalized surface and a second side that is opposite the first side. The resonating structure has a first resonant frequency of a first vibration mode and a second resonating frequency of a second vibration mode. The resonating structure is a resonating microstructure or nanostructure, and wherein the drive and sensing electrode face the second side of the resonating structure. A direct current bias source is coupled to the resonating structure. A first alternating current (AC) voltage source is coupled to the drive electrode. The first AC voltage source provides the resonating structure, via the drive electrode, with a first voltage having a frequency corresponding to the first resonant frequency. A second AC voltage source is coupled to the drive electrode. The second AC voltage source provides the resonating structure, via the drive electrode, with a second voltage having a frequency corresponding to the second resonant frequency. A read-out circuit is coupled to the sensing electrode. The read-out circuit is configured to determine a vapor and/or gas concentration based on a difference between the frequency of the first voltage supplied by the first AC voltage source and a first read-out frequency obtained by the read-out circuit from the resonating structure via the sensing electrode and is configured to determine a temperature based on a difference between the frequency of the second voltage supplied by the second AC voltage source and a second read-out frequency obtained by the read-out circuit from the resonating structure via the sensing electrode.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a beam resonator. However, the embodiments are equally applicable to any type of resonating structure.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1A:
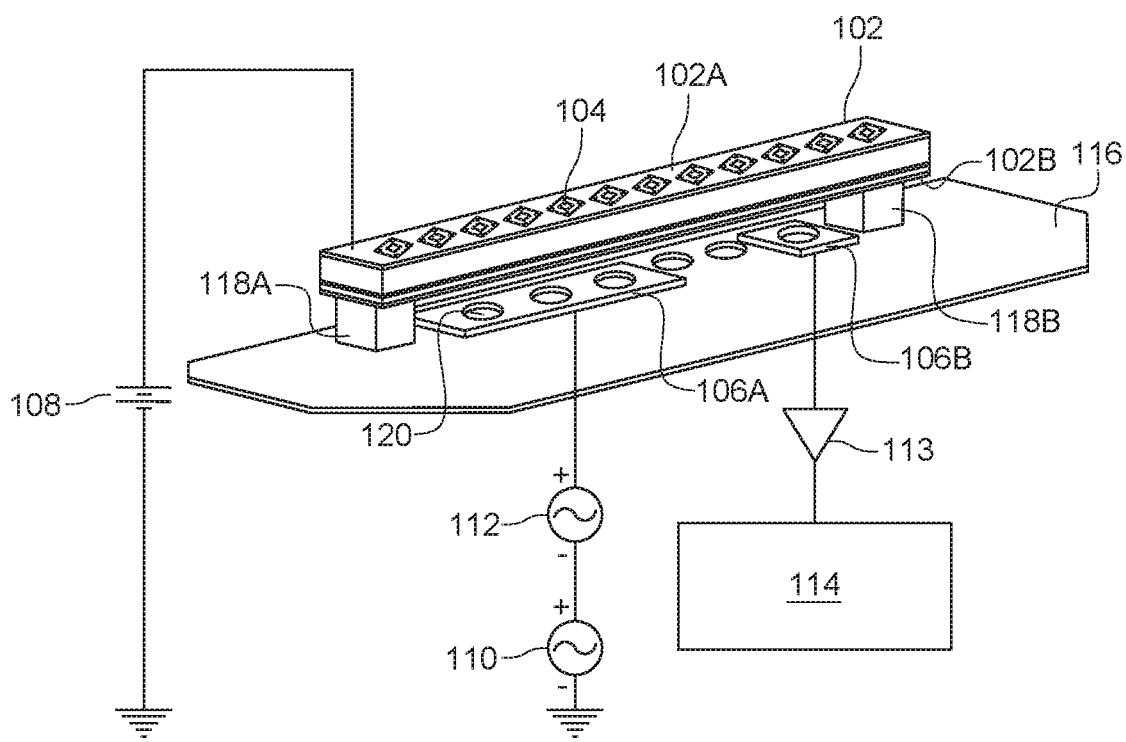
FIG. 1A is a schematic diagram of a gas concentration and temperature sensor according to embodiments.

FIG. 1A is a schematic diagram of a gas concentration and temperature sensor according to embodiments. The vapor and/or gas concentration and temperature sensor 100 includes a resonating structure 102 having a first side 102A with a functionalized surface 104 and a second side 102B that is opposite the first side 102A. The resonating structure 102 has a first resonant frequency of a first vibration mode and a second resonating frequency of a second vibration mode. The resonating structure 102 is a resonating microstructure or nanostructure. The vapor and/or gas concentration and temperature sensor 100 also includes drive electrode 106A and a sensing electrode 106B arranged facing the second side 102B of the resonating structure 102. A direct current bias source 108 is coupled to the resonating structure 102. A first alternating current (AC) voltage source 110 is coupled to the drive electrode 106A. The first AC voltage source 110 provides the resonating structure 102, via the drive electrode 106A, with a first voltage having a frequency corresponding to the first resonant frequency. A second AC voltage source 112 is coupled to the drive electrode 106A. The second AC voltage source provides the resonating structure 102, via the drive electrode 106A, with a second voltage having a frequency corresponding to the second resonant frequency. As will be appreciated, the first AC voltage source 110 and the second AC voltage source are coupled in series to the resonating structure 102. A read-out circuit 114 is coupled to the sensing electrode 106B. The read-out circuit 114 is configured to determine a vapor and/or gas concentration based on a difference between the frequency of the first voltage supplied by the first AC voltage source 110 and a first read-out frequency obtained by the read-out circuit 114 from the resonating structure 102 via the sensing electrode 106B and is configured to determine a temperature based on a difference between the frequency of the second voltage supplied by the second AC voltage source 112 and a second read-out frequency obtained by the read-out circuit 114 from the resonating structure 102 via the sensing electrode 106B.

The read-out circuit 114 can also be configured to adjust the determined vapor and/or gas concentration based on the determined temperature. The read-out circuit 114 can be any type of electronics configured to determine frequency shifts in the resonance of the resonating structure 102. Specifically, the resonating structure 102 and sensing electrode 106B form an air capacitor, and thus the read-out circuit 114 can determine the frequency shifts based on capacitance values read-out from the resonating structure 102 via the sensing electrode 106B. The read-out circuit can comprise a processor, field programmable gate array (FPGA), application specific integrated circuit (ASIC), etc. The read-out circuit 114 can also include a memory to store measurements of the vapor and/or gas concentration and temperature, as well as a display to display such values and/or a wireless transceiver to transmit these values to another device. The memory of the read-out circuit 114 can also include, for example, one or more look-up tables correlating frequency shifts in the first and second modes to vapor and/or gas concentrations and temperatures, respectively. The memory can also include a look-up table correlating temperatures with adjustments in vapor and/or gas concentrations due to the measured temperature. In the illustrated embodiment, the read-out circuit is coupled to the sensing electrode 106B via a low noise amplifier 113, which can be omitted if the read-out circuitry is able to read the signal from the sensing electrode 106B without amplification.

Figure 1B:
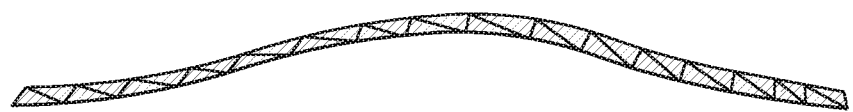
FIG. 1B is a schematic diagram of a resonating structure excited in the first vibration mode according to embodiments.
Figure 1C:
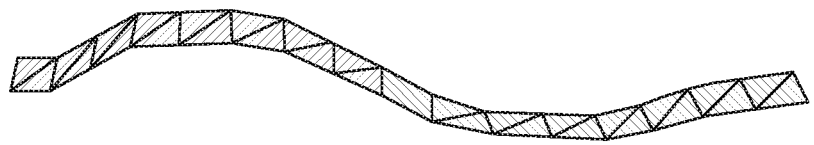
FIG. 1C is a schematic diagram of a resonating structure excited in the second vibration mode according to embodiments.

As will be recognized by those skilled in the art, resonators, such as the illustrated clamped-clamped beam, can exhibit different vibration modes depending upon the particular frequency applied to the resonator. Specifically, as illustrated in FIG. 1B, the first vibration mode of a resonator is a symmetrical mode in which the resonating structure curves upward in a symmetrical fashion between its two ends. As illustrated in FIG. 1C, the second vibration mode of a resonator is an asymmetrical mode in which one portion of the resonator curves upward and another portion curves downward in a sine-like shape. The particular applied frequency inducing any particular vibration mode depends on the size and material of the resonator. Thus, the first and second resonant frequencies discussed above will vary depending upon the size and material of the resonating structure 102.

The resonating structure 102 is described as a resonating microstructure or nanostructure. Those skilled in the art will recognize that a microstructure has its maximum dimensions in the hundreds of micrometers and a nanostructure has its maximum dimensions in the hundreds of nanometers.

Returning to FIG. 1A, the sensor 100 also includes a substrate 116 on which the resonating structure 102, the drive electrode 106A, and the sensing electrode 106B are arranged. In the embodiment illustrated in FIG. 1A, the resonating structure is a clamped-clamped beam, and thus posts 118A and 118B are interposed between the resonating structure 102 and the substrate 116. When the resonating structure 102 is configured as a cantilever beam (not illustrated), there will be a single post interposed between the resonating structure 102 and the substrate 116.

In order to reduce the effect of squeeze film damping, a number of perforations 120 are formed through the drive 106A and sensing 106B electrodes and the substrate 116. Thus, in the locations where the drive 106A and sensing 106B electrodes are on top of the substrate 116, the perforations pass through both the drive 106A or sensing 106B electrode and the substrate 116 underneath. The drive electrode 106A is illustrated as a half-electrode, which is embodied as a particular type of anti-symmetric electrode and other forms of anti-symmetric electrodes can be employed. As will be described in more detail below, the resonating structure 102 comprises a polymer interposed between two contact layers, the upper contact layer being functionalized with metal organic framework (MOF).

The direct current bias source and the first and second AC voltage sources can be embodied by any type of source that can provide the required voltage to the resonating structure 102. Further, the first and second AC voltage sources have been described as providing the resonating structure 102, via the drive electrode 106A, with a voltage having a frequency corresponding to the first and second vibration modes, respectively. Accordingly, the frequencies supplied by the first and second AC voltage sources does not need to be the exact same as the resonance frequency for the first and second vibration modes, respectively, but instead can deviate by, for example, ±5 kHz, which is half the range with a high signal-to-noise ratio.

Figure 2:
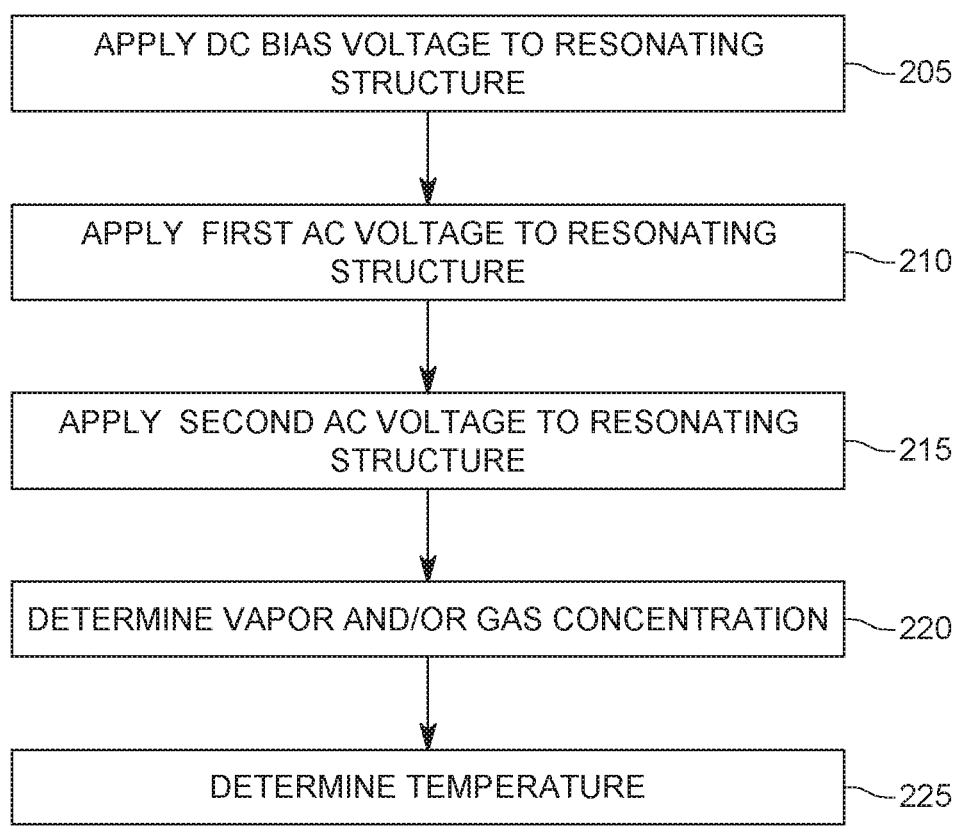
FIG. 2 is a flow diagram of a method for using a gas concentration and temperature sensor according to embodiments.

FIG. 2 is a flow diagram of a method for using a gas concentration and temperature sensor according to embodiments. A direct current bias voltage is applied to a resonating structure 102 (step 205). Consistent with the discussion above, the resonating structure 102 has a first side 102A with a functionalized surface and a second side 102B that is opposite the first side 102A, the resonating structure 102 has a first resonant frequency of a first vibration mode and a second resonating frequency of a second vibration mode. The resonating structure 102 is a resonating microstructure or nanostructure. A first AC voltage is applied to the resonating structure 102 via a drive electrode 106A, which is arranged facing the second side 102B of the resonating structure 102 (step 210). The first AC voltage provides the resonating structure 102, via the drive electrode 106A, with a first voltage having a frequency corresponding to the first resonant frequency. A second AC voltage is applied to the resonating structure 102 via the drive electrode 106A (step 215). The second AC voltage provides the resonating structure 102, via the drive electrode 106A, with a second voltage having a frequency corresponding to the second resonant frequency. A vapor and/or gas concentration is determined based on a difference between the frequency of the first AC voltage and a first read-out frequency (step 220). A temperature is determined based on a difference between the frequency of the second AC voltage and a second read-out frequency (step 225). The method can further involve adjusting the determined vapor and/or gas concentration based on the determined temperature. Although FIG. 2 illustrates the determination of the vapor and/or gas concentration and temperature being performed serially, these determinations can be performed in parallel (i.e., simultaneously) or in the reverse order.

Figure 3:
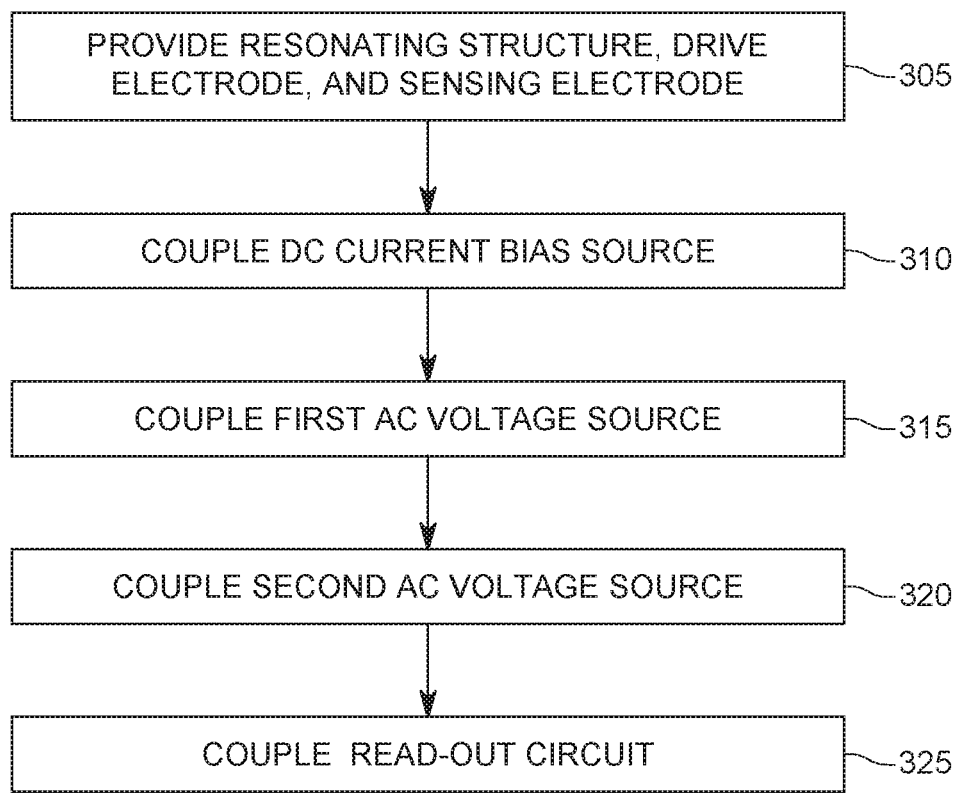
FIG. 3 is a flow diagram of a method for making a gas concentration and temperature sensor according to embodiments.

FIG. 3 is a flow diagram of a method for making a gas concentration and temperature sensor according to embodiments. Initially, a resonating structure 102, drive electrode 106A, and sensing electrode 106B are provided (step 305). The resonating structure 102 has a first side 102A with a functionalized surface 104 and a second side 102B that is opposite the first side 102A. The resonating structure 102 has a first resonant frequency of a first vibration mode and a second resonating frequency of a second vibration mode. The resonating structure 102 is a resonating microstructure or nanostructure. The drive 106A and sensing 106B electrodes face the second side 102B of the resonating structure 102.

The resonating structure 102, drive electrode 106A, and the sensing electrode 106B can be formed in any manner. Although a non-limiting example of one way to form these components will now be described, the resonating structure 102, drive electrode 106A, and sensing electrode 106B can be formed using other methods and having other dimensions. The resonating structure 102, drive electrode 106A, and sensing electrode 106B can be fabricated on, for example, a 4" silicon wafer coated with 3 μm of silicon dioxide ($SiO_2$) layer. The $SiO_2$ layer can be deposited using the plasma enhanced physical-chemical vapor deposition (PECVD) to provide the electrical insulation between the device and the wafer. Then, the $SiO_2$ layer can be patterned and etched using the reactive ion etching (RIE) to provide openings for the silicon etch, which will create the perforations in the drive 106A and sensing 106B electrodes. These perforations reduce the effect of squeeze film damping. A Cr/Au layer of 50/200 nm thickness can be sputtered and patterned to form the drive 106A and sensing 106B electrodes of the resonator, on-chip connection to the resonating structure 102, and the metal pads for wire-bonding external connections.

Using a PECVD tool, a 7 μm thick amorphous silicon (α-Si) can be deposited and then polished to a final thickness of ~3.5 μm. The polishing removes concavities in the surface due to the etching holes in the $SiO_2$ layer (underneath layer). The α-Si acts as a sacrificial layer that defines the air gap between the resonating structure 102 and the drive 106A and sensing 106B electrodes and will be etched during the final release step. The resonating structure can be composed of a 4.2 μm polyimide coated from the bottom with Cr/Au/Cr layer of thicknesses 50/200/50 nm, which forms the upper electrode of the resonator. The resonating structure can be coated from the top with Cr/Au layer of thickness 50/200 nm, which acts as a hard mask to protect the resonating structure during the etching process of the polyimide. This layer can be functionalized with a COOH-terminated layer by immersing the chip in ethanolic solution of 16-mercaptohexadecanoic acid for 24 hours. Using the layer-by-layer approach, a uniform MOF layer can be grown by dipping the chip in copper acetate metal precursor ethanolic solution and organic ligand (terephthalic acid (bcd)) ethanolic solution for five and ten minutes, respectively, to grow the Cu(bcd)

.xH$_2$O MOF thin film. The process can be repeated for, for example, ten cycles where the chip is rinsed with ethanol every cycle.

Figure 4:
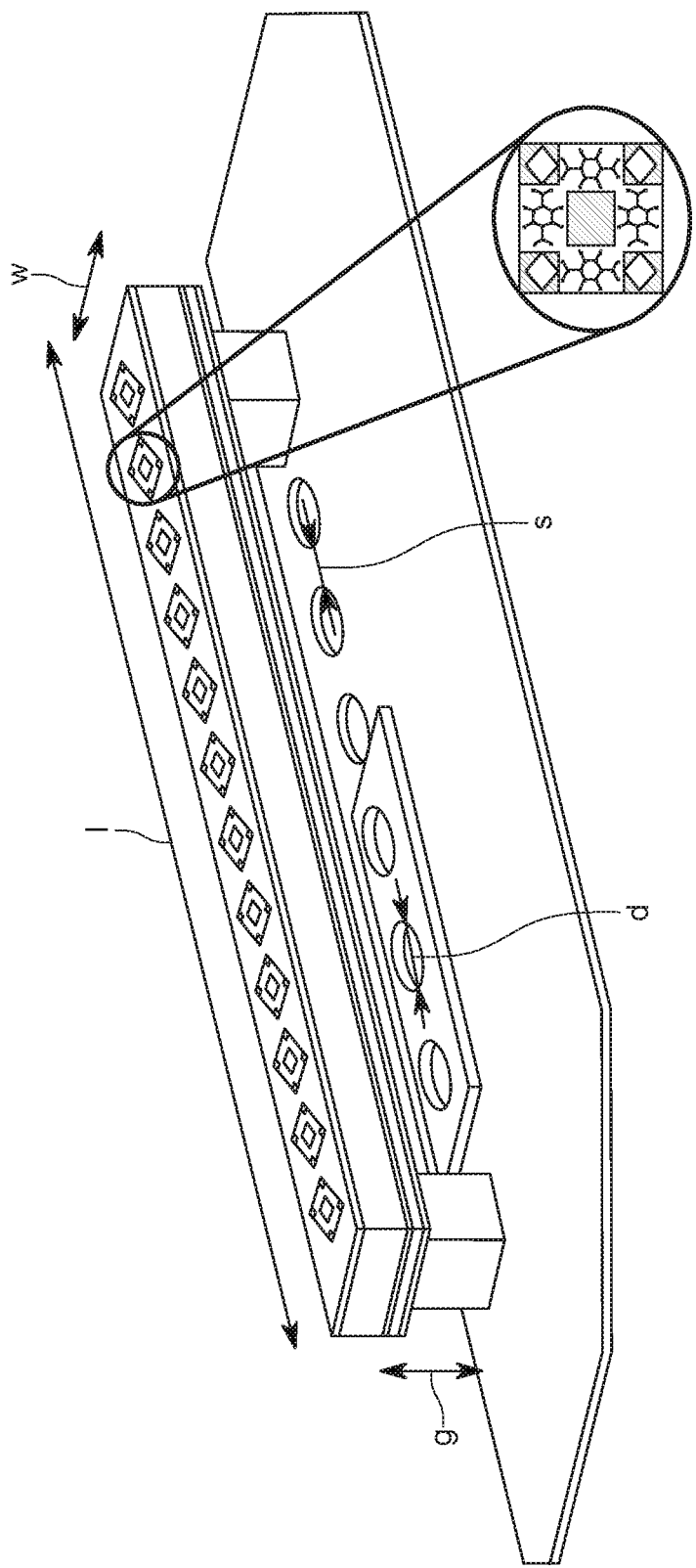
FIG. 4 is a schematic diagram of a resonating structure and first electrode of a gas concentration and temperature sensor according to embodiments.

The resonating structure can be released by fully etching sacrificial α-Si layer using the XeF$_2$ dry etchant. Extra etching cycles can be conducted to etch the silicon from the opening in the SiO$_2$ layer and form the perforations in the drive 106A and sensing 106B electrodes. Referring now to FIG. 4, the resulting clamped-clamped beam resonator can have, for example, a length (l) of 400 µm, a width (w) of 50 µm, and a gap (g) between the lower portion of the resonating structure and the substrate of 3.3 µm. Further, the lower electrode and the substrate can perforations can have, for example, a diameter (d) of 20 µm and spacing (s) between perforations of 15 µm.

Returning to FIG. 3, a direct current bias source 108 is coupled to the resonating structure 102 (step 310). A first AC voltage source 110 is coupled to the drive electrode 106A (step 315). The first AC voltage source 110 provides the resonating structure 102, via the drive electrode 106A, with a first voltage having a frequency corresponding to the first resonant frequency. A second AC voltage source 112 is coupled to the drive electrode 106A (step 320). The second AC voltage source 112 provides the resonating structure 102, via the drive electrode 106A, with a second voltage having a frequency corresponding to the second resonant frequency. A read-out circuit 114 is coupled to the sensing electrode 106B (step 325). The read-out circuit 114 is configured to determine a vapor and/or gas concentration based on a difference between the frequency of the first voltage supplied by the first AC voltage source 110 and a first read-out frequency obtained by the read-out circuit 114 from the resonating structure 102 via the sensing electrode 106B and is configured to determine a temperature based on a difference between the frequency of the second voltage supplied by the second AC voltage source 112 and a second read-out frequency obtained by the read-out circuit 114 from the resonating structure 102 via the sensing electrode 106B. Although the method has been described in connection with FIG. 3 involving a serial connection of the voltage sources and the read-out circuit, these connections can be performed in parallel and/or in a different order from what was discussed above.

The sensor in the form of a clamped-clamped beam formed in the manner discussed above and having the dimensions discussed above in connection with FIG. 4 was evaluated for its ability to simultaneously excite the first and second vibrational modes to simultaneously measure vapor concentration and temperature. The evaluation of this resonator involved using a laser doppler vibrometer (instead of a sensing electrode) to monitor the response of the resonator to the applied frequencies. In order to simplify evaluation, the vapor concentration being measured was that of water vapor. However, the disclosed sensor can determine the concentration of a wide variety of different vapors and/or a wide variety of different gasses, depending upon the type MOF applied to the upper surface of the resonator structure.

In order to demonstrate the concept of simultaneously sensing the change in water vapor concentration and environmental temperature, one considers the governing equation of motion of an electrostatically actuated clamped-clamped microbeam of length l, width b, and thickness h. The mass m of the adsorbed gas on the resonator surface is assumed to be uniformly distributed over the length of the resonating structure. A change in the chamber temperature ΔT induces an axial stress along the axis of the resonating structure. The equation of motion can be written as:

$$\frac{(M+m)}{l}\frac{\partial^2 W}{\partial x^2} + EI\frac{\partial^4 W}{\partial x^4} + c\frac{\partial W}{\partial t} = \quad (1)$$

$$\frac{\varepsilon b\left(V_{DC} + V_{AC1}\cos(\Omega_1 t) + V_{AC2}\cos(\Omega_2 t)\right)^2}{2(d-W)^2} +$$

$$\left(N - \alpha\Delta T + \frac{Ebh}{2l}\int_0^l \left(\frac{\partial W}{\partial x}\right)^2 dx\right)\frac{\partial^2 W}{\partial x^2}$$

where M is the mass of the resonating structure, d is the air gap width between the resonating structure and the anti-symmetric electrode, EI is the flexural of rigidity, c is the viscous damping, ε is the air permittivity, α is the thermal expansion coefficient, N is the axial force due to the residual stress from the fabrication, and W is the out of plane deflection. The electrostatic force is composed of two AC sources $V_{AC1}$ and $V_{AC2}$ of frequencies $\Omega_1$ and $\Omega_2$, respectively, superimposed to a DC load $V_{DC}$. The boundary conditions of the clamped-clamped microbeam are:

$$w(0,t) = 0 \quad \frac{\partial w}{\partial x}(0,t) = 0 \quad (2)$$

$$w(l,t) = 0 \quad \frac{\partial w}{\partial x}(l,t) = 0$$

The corresponding unforced and undamped eigenvalue problem of Eq. (1) is written as:

$$\phi_m''''(x) - (N_{non} - \alpha_{non}\Delta T)\phi_m''(x) - \left(1 + \frac{m}{M}\right)\omega_m^2\phi_m(x) = 0 \quad (3)$$

where $N_{non} = Nl^2/EI$ is the non-dimensional axial stress, $\alpha_{non} = \alpha l^2/EI$ is the non-dimensional thermal expansion coefficient, $\omega_{non_m} = \sqrt{ml^3/EI}\omega_m$ is the $m^{th}$ mode dimensional natural frequency, $\omega_m$ is the $m^{th}$ mode dimensional natural frequency, $\phi_m(x)$ is the $m^{th}$ mode unforced, undamped, and orthonormal clamped-clamped microbeam mode shape, and the prime refers to the spatial derivative. In order to obtain an analytical expression for the frequency shift due to a temperature change ΔT and an adsorbed mass m, the eigenvalue problem Eq. (3) is solved using a one-mode Galerkin procedure. By multiplying Eq. (3) with the $m^{th}$ mode shape and integrating along the length of the resonating structure results in:

$$\omega_m = \sqrt{\frac{\int_0^l \phi_m^{(4)}(x) \times \phi_m(x) - (N_{non} - \alpha_{non}\Delta T)\int_0^l \phi_m^{(2)}(x) \times \phi_m(x)dx}{(1 + m/M)}} \quad (4)$$

The parameters $N_{non}$ and $\alpha_{non}$ can be extracted experimentally using techniques that are well-known in the art. Accordingly, the only unknowns in Eq. (4) are the chamber temperature and the amount of mass m adsorbed on the upper surface of the resonating structure. Theoretically, tracking the frequency shift of two modes of vibration is enough to quantify the change in these two physical parameters. In the experiments, the first and second vibration modes are utilized as follows:

$$\omega_1 = \sqrt{\frac{\int_0^1 \phi_1^{(4)}(x) \times \phi_1(x)dx - (N_{non} - \alpha_{non}\Delta T)\int_0^1 \phi_1^{(2)}(x) \times \phi_1(x)dx}{(1 + m/M)}} \quad (5)$$

$$\omega_2 = \sqrt{\frac{\int_0^1 \phi_2^{(4)}(x) \times \phi_2(x)dx - (N_{non} - \alpha_{non}\Delta T)\int_0^1 \phi_2^{(2)}(x) \times \phi_2(x)dx}{(1 + m/M)}} \quad (6)$$

From Eq. (5) and Eq. (6), the temperature change and amount of adsorbed mass can be obtained. However, in vapor and/or gas sensing, the amount of vapor and/or gas adsorbed on the resonator surface depends on the temperature of the resonating structure, which implies that Eq. (5) and Eq. (6) may not be sufficient to extract the unknown parameters. To eliminate the effect of added mass, Eq. (5) is divided by Eq. (6) to obtain the ratio equation, which depends only on temperature change as below:

$$R = \frac{\omega_2}{\omega_1} = \sqrt{\frac{\int_0^1 \phi_2^{(4)}(x) \times \phi_2(x)dx - (N_{non} - \alpha_{non}\Delta T)\int_0^1 \phi_2^{(2)}(x) \times \phi_2(x)dx}{\int_0^1 \phi_1^{(4)}(x) \times \phi_1(x)dx - (N_{non} - \alpha_{non}\Delta T)\int_0^1 \phi_1^{(2)}(x) \times \phi_1(x)dx}} \quad (7)$$

To experimentally extract the resonance frequency, the resonating structure was excited with white noise signal and the amplitude at different points along the length of the resonating structure were recorded. The chamber pressure was fixed at 4 mTorr during this test. The measured resonance frequency values near the first ($f_1$=117.3 kHz) and second ($f_2$=286.2 kHz) vibration modes were used to extract the residual axial force N. The recorded mode shapes matched the clamped-clamped microbeam mode shapes, which indicates the uniformity of the MOFs coating; non-uniform coating induces distortion in the mode shapes.

Next, frequency response curves were generated by exciting the resonating structure with a harmonic signal while recording the maximum amplitude $W_{max}$ of vibration, which for the second vibration mode is at the quarter of the length of the resonating structure. The excitation signal was composed of an AC signal $V_{AC}$ superimposed to a DC signal VDC. The results near the first vibration mode and second vibration mode for different VAC amplitudes and at atmospheric chamber pressure allow selection of the suitable actuation voltage to operate the device with significant amplitudes above the noise level, and also for transforming the recorded amplitude shift due to gas exposure or temperature change into frequency data. The frequency shift values can be utilized in quantifying the amount of mass adsorbed on the resonator surface, and for extracting different thermodynamics and kinetics parameters that are essential for characterizing the coating material.

The resonating structure was also excited by a multifrequency signal (i.e., two AC signals) of frequencies: $\Omega_1$=121 kHz, fixed near the first vibration mode, and $\Omega_2$ which was swept near the second vibration mode. The first source amplitude $V_{AC1}$ was varied, while the second source amplitude $V_{AC2}$ was fixed at $V_{AC2}$=36 V. These two signals were superimposed to a DC voltage VDC=50 V. The reported frequency response curves demonstrated the significance of multimode excitation in raising the floor of higher order modes above the noise level, which is important in sensing applications. Increasing the voltage amplitude near the first vibration mode $V_{AC1}$ increases the floor of the second vibration mode frequency response.

The sensor resolution was evaluated by monitoring the amplitude evolution over time in the open loop configuration. The resonating structure was actuated with harmonic signal composed of two frequencies $\Omega_1$ and $\Omega_2$ near the first and second vibration modes, respectively. To record the amplitude fluctuation at each vibration mode, LabVIEW software was used to perform a fast Fourier transform FFT on the real-time data of the response of the resonating structure. The resulting frequency spectra was then used to record the amplitude at each frequency. The experiment demonstrated a maximum amplitude fluctuation around 5 nm for the first vibration mode and 10 nm for the second vibration mode. This fluctuation can be attributed to intrinsic sources, such as defect motion, or extrinsic sources, such as thermo-mechanical noise, temperature fluctuation, adsorption-desorption noise, and instrumentation noise.

In order to further analyze the stability of the resonating structure, the Allan deviation was calculated. The amplitude fluctuation data obtained in the experiments was converted into frequency by utilizing frequency response curves generated using the testing described above. The Allan deviation can be expressed as:

$$\sigma_f(\tau) = \sqrt{\frac{1}{2(N-1)}\Sigma_{i=1}^{N-1}(\overline{f_{i+1}^\tau} - \overline{f_i^\tau})^2} \quad (8)$$

where N is the sample size and $\overline{f_i^\tau}$ is the average frequency fluctuation over the ith time interval $\tau$ defined as:

$$\overline{f}_i(\tau) = \frac{f(i) - f_0}{f_0} \quad (9)$$

where f(i) is the measured frequency at the time step i, and $f_0$ is the resonator nominal frequency. The Allan deviation curve showed typical mechanical resonator behavior. For a short period of time the fluctuation is dominated by the white noise, whereas for higher integration time the fluctuation increases due to random walk and steady drift. The Allan deviation curves showed the enhanced stability of the second vibration mode $\sigma_{f2}(50)$=18.67 ppm compared with the first vibration mode $\sigma_{f1}(50)$=39 ppm. The corresponding frequency fluctuation near the first vibration mode and second vibration mode were, respectively, $\Delta f_1$=4.7 Hz and $\Delta f_2$=5.5 Hz The vibration of the clamped-clamped resonating structure induces a uniform strain across the resonating structure generating axial stress that changes the stiffness of the resonating structure. This can affect the frequency of the excited mode (self-tuning) or the frequency of the other modes (cross-tuning). In the Euler-Bernoulli equation, Eq. (1), this effect is modeled as the mid-plane stretching term (the following term in Eq. (1)

$$\frac{Ebh}{2l}\int_0^l \left(\frac{\partial W}{\partial x}\right)^2 dx,$$

which accounts for the elongation of the resonating structure due to the out of plane vibration.

To simplify the study, the operating frequencies were selected such that the frequency shift due to the cross-tuning is negligible. To experimentally find these frequencies, the resonating structure was actuated with harmonic signals $\Omega_1$ and $\Omega_2$. $\Omega_1$ was fixed at 121 kHz (first vibration mode) while $\Omega_2$ was swept around the second vibration mode. The recorded dip in the first vibration mode response was maximum near the second vibration mode maximum amplitude ($\Omega_2$=291 kHz) due to the modes cross-tuning. However, moving away from the second vibration mode peak, the measured fluctuation in the first vibration mode was below 5 nm and can be attributed to the external disturbances and noises.

In the experiments, the second vibration mode frequency was fixed at 294.5 kHz. Accordingly, as water vapor is adsorbed and/or environmental temperature changes, the second vibration mode frequency shifts to lower values and the amplitude at 294.5 kHz falls down following the right branch of the second vibration mode, which is the range with minimum cross-tuning effect.

To experimentally extract the sensitivity of the resonating structure due to temperature change, the frequency response of the resonating structure near the first and second vibration modes at different chamber temperatures was recorded. A photothermal heater was used to control the chamber temperature and a thermocouple was placed in close proximity to the chip to record the temperature values. The experimentally extracted responsivity near the first vibration mode was $\mathfrak{R}_T^{1st}$=128 Hz/° C. and for the second vibration mode is $\mathfrak{R}_T^{2nd}$=187 Hz/° C., which indicates almost 1.5 times enhanced responsivity of the second vibration mode. From the noise analysis, the minimum detectable temperature near the second vibration mode was $\Delta T_{min} = \Delta f_{min}/\mathfrak{R}_T^{2nd}$=0.03° C.

Real-time measurements of the frequency shifts near the first and second vibration modes of vibration at different chamber temperatures and water vapor concentrations were also performed. The real time data were recorded after flushing the chamber with nitrogen at 1 l/min flow for an extended period of time. The water vapor concentration C was controlled by changing the nitrogen flow inside the bubbler. The temperature bath was fixed at 22° C. The water vapor concentration values were calculated following the procedure demonstrated in Reference Document [1]. The responsivity of the resonating structure due to water vapor adsorption at T=22° C. near the first and second vibration modes were $\mathfrak{R}_C^{1st}$=0.8 Hz/ppm and $\mathfrak{R}_C^{2nd}$=4.6 Hz/ppm, respectively. The minimum detectable concentration was $$\Delta C_{min} = \frac{\Delta f_{min}}{\mathfrak{R}_C^{2nd}} = 4.6 \text{ ppm.}$$

As expected, a better sensitivity is exhibited near the second vibration mode. The improved sensitivity near the second vibration mode encourages the effort toward optimized resonator designs to efficiently excite the higher order modes of vibration for ultrasensitive applications.

By investigating the real-time data, it was noted that increasing the temperature at particular concentration values decreases the recorded frequency shift due to the reduced amount of water molecules adsorbed on the resonator surface.

Theoretically, the frequency ratio R should be horizontal straight lines for fixed chamber temperature and different water vapor concentrations. However, the experimentally recorded ratios show a slight deviation, which can be attributed to the temperature fluctuation, and the different vibrational velocity of each point along the length of the resonating structure. From basic adsorption theories, it is known that gas adsorption strongly depends on the surface temperature, gas concentration, and the velocity of the surface. Hence, even if the MOFs coating was uniformly distributed along the length of the resonating structure, the difference in vibrational velocity along the resonating structure results in position-dependent adsorption.

The significance of the disclosed sensor was demonstrated by considering a case study where the experimentally measured frequency values near the first and second vibration modes are 117.8 kHz and 290 kHz, respectively. The corresponding frequency ratio R was 2.461. It was noted that the only point satisfying the measured frequency values and their corresponding ratio is 1750 ppm concentration at 45° C. Hence, using two vibration modes of a single resonating structure, it is possible to measure the change in two physical stimuli. These findings can be potentially extended to measure multiple physical parameters by increasing the number of modes.

The disclosure above provides a new technique to measure two physical stimuli using a single electrostatically actuated resonating structure coated with MOFs and operated in air. The technique involves simultaneously actuating and tracking two frequencies of two vibration modes of a resonating structure. The case study for measuring environmental temperature and humidity concentration demonstrated a minimum detectable temperature variation of 0.03° C. and a water vapor concentration of 4.6 ppm near the second vibration mode. The disclosed technique was confirmed by a simple mathematical model. Optimizing the resonating structure design to excite higher order modes will open the door for simultaneously measuring multiple physical stimuli using a single resonating structure, which reduces the power consumption, device size, and cost, and leads to smarter generation of sensors.

The disclosed embodiments provide a sensor including resonator structure providing simultaneous gas concentration and temperature measurements. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] Jaber, N., Ilyas, S., Shekhah, O., Eddaoudi, M. & Younis, M. I. Resonant Gas Sensor and Switch Operating in Air With Metal-Organic Frameworks Coating. *Journal of Microelectromechanical Systems* 27, 156-163 (2018).

What is claimed is:

1. A vapor and/or gas concentration and temperature sensor, comprising:
   a resonating structure having a first side with a functionalized surface and a second side that is opposite the first side, wherein the resonating structure has a first resonant frequency of a first vibration mode and a second resonant frequency of a second vibration mode, and wherein the resonating structure is a resonating microstructure or nanostructure;
   a drive electrode and a sensing electrode arranged facing the second side of the resonating structure;
   a direct current bias source coupled to the resonating structure;
   a first alternating current, AC, voltage source coupled to the drive electrode, wherein the first AC voltage source provides the resonating structure, via the drive electrode, with a first voltage having a frequency corresponding to the first resonant frequency;
   a second AC voltage source coupled to the drive electrode, wherein the second AC voltage source provides the resonating structure, via the drive electrode, with a second voltage having a frequency corresponding to the second resonant frequency; and
   a read-out circuit coupled to the sensing electrode, wherein the read-out circuit is configured to determine a vapor and/or gas concentration based on a difference between the frequency of the first voltage supplied by the first AC voltage source and a first read-out frequency obtained by the read-out circuit from the resonating structure via the sensing electrode and is configured to determine a temperature based on a difference between the frequency of the second voltage supplied by the second AC voltage source and a second read-out frequency obtained by the read-out circuit from the resonating structure via the sensing electrode.

2. The vapor and/or gas concentration and temperature sensor of claim 1, wherein the read-out circuit is further configured to adjust the determined vapor and/or gas concentration based on the determined temperature.

3. The vapor and/or gas concentration and temperature sensor of claim 1, wherein the first side of the resonating structure comprises metal organic framework that functionalizes the first side to detect a particular type of vapor and/or gas.

4. The vapor and/or gas concentration and temperature sensor of claim 1, further comprising:
   a substrate on which the drive electrode, sensing electrode, and the resonating structure are arranged, wherein a plurality of perforations pass through the drive electrode and the substrate.

5. The vapor and/or gas concentration and temperature sensor of claim 4, wherein the plurality of perforations in the substrate are evenly spaced along a length of the resonating structure.

6. The vapor and/or gas concentration and temperature sensor of claim 4, wherein the resonating structure is a clamped-clamped beam, the sensor further comprising:
   first and second posts interposed between the resonating structure and the substrate.

7. The vapor and/or gas concentration and temperature sensor of claim 4, wherein the resonating structure is a cantilever beam, the sensor further comprising:
   a single post interposed between the resonating structure and the substrate.

8. The vapor and/or gas concentration and temperature sensor of claim 1, wherein the resonating structure comprises a polymer interposed between first and second electrical contact layers.

9. The vapor and/or gas concentration and temperature sensor of claim 1, wherein the first AC voltage source and the second AC voltage source are coupled to the resonating structure in series.

10. The vapor and/or gas concentration and temperature sensor of claim 1, wherein the first and second resonant frequencies depend upon a geometry of the resonating structure and a material comprising the resonating structure.

11. A method for determining vapor and/or gas concentration and temperature using a vapor and/or gas concentration and temperature sensor, the method comprising:
    applying a direct current bias voltage to a resonating structure, wherein the resonating structure has a first side with a functionalized surface and a second side that is opposite the first side, wherein the resonating structure has a first resonant frequency of a first vibration mode and a second resonant frequency of a second vibration mode, and wherein the resonating structure is a resonating microstructure or nanostructure;
    applying a first alternating current, AC, voltage to the resonating structure via a drive electrode, which is arranged facing the second side of the resonating structure, wherein the first AC voltage provides the resonating structure, via the drive electrode, with a first voltage having a frequency corresponding to the first resonant frequency;
    applying a second AC voltage to the resonating structure via the drive electrode, wherein the second AC voltage provides the resonating structure, via the drive electrode, with a second voltage having a frequency corresponding to the second resonant frequency;
    determining a vapor and/or gas concentration based on a difference between the frequency of the first AC voltage and a first read-out frequency; and
    determining a temperature based on a difference between the frequency supplied by the second AC voltage and a second read-out frequency.

12. The method of claim 11, further comprising:
    adjusting the determined vapor and/or gas concentration based on the determined temperature.

13. The method of claim 11, wherein the vapor and/or gas concentration and the temperature are determined simultaneously.

14. The method of claim 11, wherein the first side of the resonating structure comprises metal organic framework that functionalizes the first side to detect a particular type of vapor and/or gas based on an amount of the particular type of vapor and/or gas residing on the metal organic framework.

15. The method of claim 11, wherein the first AC voltage has a smaller amplitude than the second AC voltage.

16. A method for forming a vapor and/or gas concentration and temperature sensor, comprising:
    providing a resonating structure, a drive electrode, and a sensing electrode, wherein the resonating structure has a first side with a functionalized surface and a second side that is opposite the first side, wherein the resonating structure has a first resonant frequency of a first vibration mode and a second resonant frequency of a second vibration mode, wherein the resonating structure is a resonating microstructure or nanostructure, and wherein the drive and sensing electrode face the second side of the resonating structure;

coupling a direct current bias source to the resonating structure;
coupling a first alternating current, AC, voltage source to the drive electrode, wherein the first AC voltage source provides the resonating structure, via the drive electrode, with a first voltage having a frequency corresponding to the first resonant frequency;
coupling a second AC voltage source to the drive electrode, wherein the second AC voltage source provides the resonating structure, via the drive electrode, with a second voltage having a frequency corresponding to the second resonant frequency; and
coupling a read-out circuit to the sensing electrode, wherein the read-out circuit is configured to determine a vapor and/or gas concentration based on a difference between the frequency of the first voltage supplied by the first AC voltage source and a first read-out frequency obtained by the read-out circuit from the resonating structure via the sensing electrode and is configured to determine a temperature based on a difference between the frequency of the second voltage supplied by the second AC voltage source and a second read-out frequency obtained by the read-out circuit from the resonating structure via the sensing electrode.

17. The method of claim 16, further comprising:
arranging the drive electrode, the sensing electrode, and the resonating structure on a substrate.

18. The method of claim 17, further comprising:
forming a plurality of perforations through the drive electrode and the substrate.

19. The method of claim 16, wherein the resonating structure is a clamped-clamped beam, the method further comprising:
interposing first and second posts between the resonating structure and the substrate.

20. The method of claim 16, wherein the resonating structure is a cantilever beam, the method further comprising:
interposing a single post between the resonating structure and the substrate.

* * * * *